(12) United States Patent
Bechtold

(10) Patent No.: US 8,986,583 B2
(45) Date of Patent: Mar. 24, 2015

(54) PULTRUSION PROCESS FOR PRODUCTION OF A CONTINUOUS PROFILE

(75) Inventor: Michael Bechtold, Mönsheim (DE)

(73) Assignee: AIRBUS Operations GmbH, Hamburg (DE)

( * ) Notice: Subject to any disclaimer, the term of this patent is extended or adjusted under 35 U.S.C. 154(b) by 226 days.

(21) Appl. No.: 12/595,224

(22) PCT Filed: Jul. 2, 2007

(86) PCT No.: PCT/EP2007/056629
§ 371 (c)(1),
(2), (4) Date: Apr. 19, 2010

(87) PCT Pub. No.: WO2008/125150
PCT Pub. Date: Oct. 23, 2008

(65) Prior Publication Data
US 2011/0049750 A1 Mar. 3, 2011

Related U.S. Application Data

(60) Provisional application No. 60/912,281, filed on Apr. 17, 2007.

(30) Foreign Application Priority Data

Apr. 17, 2007 (DE) .......................... 10 2007 018 052

(51) Int. Cl.
*B28B 11/14* (2006.01)
*B29C 43/22* (2006.01)
(Continued)

(52) U.S. Cl.
CPC .............. *B29C 70/16* (2013.01); *B29C 69/001* (2013.01); *B29C 70/222* (2013.01);
(Continued)

(58) Field of Classification Search
USPC .......................................... 264/136; 156/201
See application file for complete search history.

(56) References Cited

U.S. PATENT DOCUMENTS

| 4,151,031 A | 4/1979 | Goad et al. |
| 4,219,980 A | 9/1980 | Loyd |

(Continued)

FOREIGN PATENT DOCUMENTS

| DE | 603 11 453 T2 | 11/2007 |
| FR | 2408448 | 6/1979 |

(Continued)

OTHER PUBLICATIONS

German Examination Report, German Application No. 10 2007 018 052.9-16, Apr. 7, 2011, 7 pages.

(Continued)

*Primary Examiner* — Jeffrey Wollschlager
(74) *Attorney, Agent, or Firm* — Fenwick & West LLP

(57) ABSTRACT

The invention relates to a pultrusion process in which a continuous reinforcement profile is formed by canting of at least one prepreg strip composed of a fiber-reinforced plastics material. The first shaping of the profile takes place in a preform device, which is downstream of a pressure-molding device for final shaping and prehardening. The movement of the profile takes place synchronously with respect to the operating cycle of the pressure-molding device by means of a traction device. By using a cutting device, it is possible to cut the profile to length and/or to subject edges to subsequent mechanical operations to ensure that correct dimensions are maintained. A continuous (pultrusion) gusset is inserted between the prepreg strips in a radius region of the profile. The gusset has an approximately triangular cross sectional geometry and it is formed by a plurality of continuous fibers braided with one another.

9 Claims, 2 Drawing Sheets

(51) Int. Cl.
*B29C 70/52* (2006.01)
*B29C 70/16* (2006.01)
*B29C 69/00* (2006.01)
*B29C 70/22* (2006.01)
*B29C 70/54* (2006.01)
*B29C 70/86* (2006.01)
*B29D 99/00* (2010.01)
*B29C 47/00* (2006.01)
*B29K 105/06* (2006.01)
*B29L 31/00* (2006.01)

(52) U.S. Cl.
CPC ............ *B29C 70/521* (2013.01); *B29C 70/545* (2013.01); *B29C 70/865* (2013.01); *B29C 47/003* (2013.01); *B29C 47/0038* (2013.01); *B29C 2793/009* (2013.01); *B29K 2105/06* (2013.01); *B29L 2031/003* (2013.01); *B29L 2031/772* (2013.01); *B29D 99/0003* (2013.01)
USPC ...... 264/146; 264/167; 264/171.13; 264/280; 156/166; 156/177; 156/180; 156/242; 156/245; 156/436

(56) References Cited

U.S. PATENT DOCUMENTS

| | | | |
|---|---|---|---|
| 4,331,723 A | 5/1982 | Hamm | |
| 4,512,835 A * | 4/1985 | Gardiner | 156/174 |
| 4,606,961 A | 8/1986 | Munsen et al. | |
| 5,043,128 A * | 8/1991 | Umeda | 264/258 |
| 5,683,778 A * | 11/1997 | Crosier | 428/59 |
| 6,231,941 B1 * | 5/2001 | Cundiff et al. | 428/36.3 |
| 6,569,371 B1 * | 5/2003 | Asari et al. | 264/231 |
| 2002/0014302 A1 * | 2/2002 | Fanucci et al. | 156/179 |
| 2005/0126714 A1 * | 6/2005 | Kasai et al. | 156/425 |

FOREIGN PATENT DOCUMENTS

| | | | |
|---|---|---|---|
| FR | 2408448 A | | 6/1979 |
| JP | 62 202725 A | | 9/1987 |
| JP | 64-75226 A | | 3/1989 |
| JP | 2003 071941 A | | 3/2003 |
| RU | 2055734 | * | 3/1996 |
| RU | 2055734 C1 | | 3/1996 |
| RU | 2285613 | * | 10/2006 |
| RU | 2285613 C1 | | 10/2006 |
| WO | WO 00/03854 A2 | | 1/2000 |
| WO | WO 2007/119371 A1 | | 10/2007 |

OTHER PUBLICATIONS

Japanese Office Action, Japanese Application No. 2010-503363, 2012, 17 pages.
Chinese Second Office Action, Chinese Application No. 200780052564.8, Sep. 13, 2012, 7 pages.
Xiaoyin, C. et al., A Review of Pultruded Composite Materials, Engineering Plastics Application, Mar. 1988, pp. 55-60, Issue 3.
Chinese Fourth Office Action, Chinese Application No. 200780052564.8, Jan. 30, 2014, 7 pages.
Zhong, M., "Braided Composite Material," Fiber Composite Material, Jun. 30, 1992, pp. 42-49, vol. 2.
PCT International Search Report and Written Opinion, PCT/EP2007/056629, Dec. 28, 2007, 10 pages.
Russian Decision on Granting, Russian Application No. 2009138876/05(055041), Sep. 21, 2011, 4 pages.

* cited by examiner

PULTRUSION PROCESS FOR PRODUCTION OF A CONTINUOUS PROFILE

FIELD OF THE INVENTION

The invention relates to a pultrusion process for production of a continuous profile with at least one prepreg strip, where the at least one prepreg strip is first preformed in a preform device and then is passed in cycles through a heated pressure-molding device for production of a final cross-sectional geometry, and finally is completely hardened in a posthardening device.

Composite components formed using carbon-fiber-reinforced epoxy resins are increasingly used in aircraft construction in order to save weight. By way of example, the inner sides of aircraft wings are reinforced with stringers composed of a carbon-fiber-reinforced composite material. There is also increasing use in passenger aircraft of carbon-fiber-reinforced epoxy-resin cross members for floor bracing.

The main problem in the production of these composite components is provision of a continuous production process that can give an adequate number of composite components of the highest quality, in particular in the form of continuous profiles, and that at the same time gives sufficiently reliably reproducible maintenance of correct dimensions of the final products. The intention is moreover that production generates the smallest possible number of reject parts, for example parts having air inclusions or cracks, and at the same time the process must permit a high degree of automation.

One known manufacturing process which complies with much of this requirement profile is the process known as the "advanced" pultrusion process (ADP process).

In this process, ("continuous") prepreg strips are drawn off from large feed reels and are formed by means of a preform device for example to give a continuous profile with approximately H-shaped cross-sectional geometry. The profile then passes through a heated pressure-molding device, which uses simultaneous application of pressure and heat to give the profile the desired final cross-sectional geometry. To this end, the pressure-molding device has a plurality of tools which in the closed condition exactly replicate the cross-sectional geometry of the profile. The profile is not passed continuously through the pressure-molding device but instead the pressure-molding devices are first opened and a section of the profile previously preformed, corresponding approximately to the length of the tool, is drawn into the pressure-molding device by means of a traction device. The pressure-molding device is then closed, whereupon the profile receives the final cross-sectional geometry via application of pressure and heat. The pressure-molding device remains closed until the profile has hardened to the extent that it has sufficient intrinsic stability for the subsequent steps of the process. Once this degree of hardening has been achieved, the pressure-molding device is in turn opened and a further section of the profile preformed in the preform device is drawn into the pressure-molding device by means of the traction device. It is preferable that the final hardening of the profile strand does not take place until a post-hardening device has been reached. The transport of the profile through the system takes place discontinuously or in operating cycles which follow one another in sequence. The length of a section to be drawn into the pressure-molding device can be selected to be slightly smaller than one operating length of the pressure-molding device, thus producing narrow regions of overlap on the profile which are molded and prehardened twice in the pressure-molding device, the result being that, despite stepwise transport, the profile strand receives continuous treatment without any discontinuities.

After passage through the traction device, the profile is finally converted to the required dimensions and/or cut to length in a downstream cutting device. It is possible here, for example, to separate a profile with H-shaped cross-sectional geometry along the vertical web connecting the flanges and thus to produce two profiles each with T-shaped cross-sectional geometry which can for example serve as stringers for the reinforcement of aerodynamic surfaces.

This known ADP process permits almost completely automatic manufacture of up to 2 m of profile length per hour with almost any desired cross-sectional geometry and with a very high level of maintenance of correct dimensions.

A particular problem with the known pultrusion processes is the radius regions of the profiles, in which the prepreg strips adjoin one another at an angle of about 90°, forming an undefined cavity generally taking the shape of a (triangular) gusset. This cavity is empty and the result can, for example, be deviations of the actual geometry of the profiles from their intended geometry, the profiles thus affected therefore being scrap.

SUMMARY OF THE INVENTION

It is an aspect of the invention to provide a process for production of continuous profiles from fiber-composite materials which avoids the disadvantages described above.

If at least one continuous gusset is inserted into at least one radius region of the profile, in particular during the preform process, cavities inevitably produced in the radius region by the pultrusion process are filled in a defined manner by the gusset or by the continuous gusset strand, thus preventing occurrence of any geometric deviations of the profile, in particular in the form of lateral angular displacement of the vertical web on the terminal flanges in profiles with, for example, H-shaped cross-sectional geometry. These geometric deviations can take the form of lateral angular displacements of the web for example in profiles with H-shaped cross-sectional geometry, the result being that the angle between the web and the flanges deviates from 90°.

Any desired combination of reinforcement fibers using suitable thermoset and/or thermoplastic synthetic resins can be used to form the (preimpregnated) prepreg strips. However, it is preferable to use prepreg strips formed using an epoxy-resin-saturated carbon-fiber reinforcement arrangement. The carbon-fiber reinforcement arrangement can by way of example encompass discrete carbon fibers, carbon-fiber rovings, carbon-fiber scrims, carbon-fiber textiles or any desired combination thereof. It is also possible to use glass fibers, Kevlar® fibers or natural fibers.

Continuously braided reinforcement fibers form the at least one pultrusion gusset, whose cross-sectional geometry corresponds approximately to that of an isosceles triangle, the equal-length longitudinal edges of which have been drawn inwards in the shape of an arc. The reinforcement fibers used to form the pultrusion gusset or the continuous gusset can be the same as those also used in the prepreg strips. It is preferable to use braided carbon fibers whose fiber orientations are 0° and/or ±45° to form the gusset. As an alternative, it is also possible to use glass fibers, aramid fibers, ceramic fibers, thermoplastic fibers or any desired combination of these types of fiber to form the gusset. It is possible to use thermoplastic fibers, since in the finished structure of the profile the gusset is not responsible for any load-bearing function once its filling and supporting function during the pultrusion process has ended.

The manner of introduction of the at least one gusset into the process sequence is the same as that of introduction of the prepreg strips, via one or more reels.

Twisted carbon-fiber-reinforced plastics textile strips, monodirectional carbon-fiber-reinforced plastics strips or carbon-reinforced plastics fibers have only low intrinsic stability when used to form gussets and can give poorly defined structures when subjected to pressure. The result can be excess compression on the radius side and inadequate compression on the other side, with resultant failure to achieve the radius quality demanded with regard to fiber volume content. In contrast, braided gussets have substantially more intrinsic stability and spontaneously position themselves throughout the shape of the triangle, the braided gussets therefore automatically moving to the correct position. Accordingly, it is preferable to use braided gussets for the inventive process.

A braid using dry reinforcement fibers can be used to form the gusset. In this case, the gusset generally passes through a resin bath upstream of the pressure-molding device, in order to ensure adequate saturation of the gusset with synthetic resin prior to entry into the pressure-molding device. As an alternative, it is possible to omit the resin bath if there is adequate synthetic-resin saturation of the actual prepreg strips, thus ensuring adequate saturation of the gusset by expressed resin in the pressure-molding device. The inventive process permits "quasi"-continuous manufacture of profiles with complex cross-sectional geometries using composite materials, in particular using carbon-fiber-reinforced epoxy resins.

Further claims set out further advantageous embodiments of the inventive pultrusion process.

The inventive process is illustrated in more detail taking the example of a profile with H-shaped cross-sectional geometry. In principle, this process can in particular produce profiles whose cross-sectional geometry is longitudinally constant, and this includes by way of example cross-sectional geometries corresponding to T-profiles, X-profiles, L-profiles, or other profiles. The process can be modified appropriately for combining prepreg strips for other profile geometries. The gusset regions which according to the invention are filled in a defined manner in order to achieve constant component thickness in the radius regions are produced wherever edge-angled prepreg strips are brought together.

BRIEF DESCRIPTION OF THE DRAWINGS

The drawing shows.

DETAILED DESCRIPTION OF THE DRAWINGS

Figure 1:
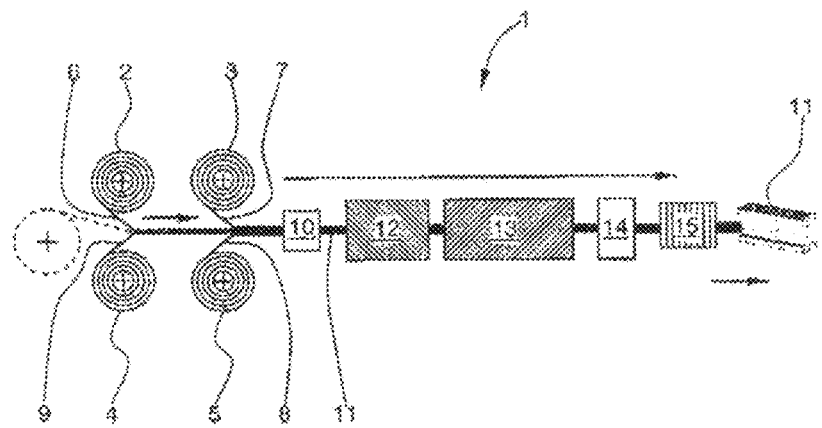
in FIG. 1 a diagram of a system for carrying out the pultrusion process,
in FIG. 2 the production of an H-shaped profile from four initially flat prepreg strips,
in FIG. 3 a cross-sectional view through the heated pressure-molding device,
in FIG. 4 an enlarged detail from FIG. 3, and
in FIG. 5 a cross section through a gusset.

In the drawing, the same design elements always have the same reference numeral.

FIG. 1 is a diagram of a pultrusion system which is suitable for carrying out the "advanced" pultrusion process and which uses "continuous" prepreg strips.

The apparatus 1 has, inter alia, four (feed) reels 2 to 5 with prepreg strips 6 to 9. In order to inhibit adhesion between the prepreg strips 6 to 9, one side of the prepreg strips 6 to 9 has been provided with a peelable release film. The thickness of the material of prepreg strips 6 to 9 is suitable for production of the desired profile geometry, as is their width. The reel shown by a broken line but not shown in any great detail represents a device for the inventively modified process using a gusset (cf. FIGS. 3 to 5).

In the region of a preform device 10 the prepreg strips 6 to 9 are brought together and molded, thus producing at this early stage approximately the desired cross-sectional geometry of the profile 11 to be produced. The preform device 10 has a large number of preferably release-coated rolls and rollers which angle the edges of some of the preferably at least four prepreg strips 6 to 9, these strips then being brought together with flat prepreg strips 6 to 9 to form the profile.

The pressure-molding device 12 is downstream of the preform device 10. The final shaping of the profile takes place in the pressure-molding device 12 via simultaneous application of high pressure and of heat. For this purpose, the pressure-molding device 12 generally has a plurality of metal tools (not shown in FIG. 1) which, in the closed position, exactly replicate the cross-sectional geometry or the shape of the profile 11 to be produced. In each case, the direction of movement of the profile 11 through the apparatus 1 is illustrated via the black arrows running horizontally.

The profile 11 is not continuously drawn through the entire apparatus 1. Instead, the profile 11 is successively passed through the apparatus 1 in cycles in longitudinal sections, each of which corresponds approximately to the longitudinal dimension of the pressure-molding device 12. In this procedure, the tools of the pressure-molding device 12 are firstly separated to the extent that an appropriate section of the profile 11 can be drawn into the pressure-molding device 12 without experiencing any resistance. The pressure-molding device 12 is then fully closed, and the final shaping and partial hardening of the profile 11 then takes place in this section with simultaneous application of pressure and heat. The relevant section of the profile 11 remains in the pressure-molding device 12 until the profile 11 has sufficient initial intrinsic mechanical stability for passage through the subsequent steps of the process. Downstream of the pressure-molding device 12, there is a posthardening device 13 in which complete hardening of the profile 11 takes place. The posthardening device 13 is followed by a traction device 14 by means of which the profile 11 is successively drawn in cycles through the system.

The profile is converted to its intended dimension in a cutting device 15. Possible processes in the cutting device 15 go beyond edge trimming of the profile, an example being that, in the case of a profile whose cross-sectional geometry is H-shaped, the web present can be completely separated in the longitudinal direction of the profile, thus producing two continuous profiles with T-shaped cross-sectional geometry.

The apparatus 1 described above is capable of continuous manufacture of profiles composed of composite material with almost any desired cross-sectional geometries, as long as the pressure-molding device 12 has been supplied with suitable tools and a sufficient number of prepreg strips 6 to 9 with the right width and thickness of material is kept available on the four (feed) reels 2 to 5.

Figure 2:
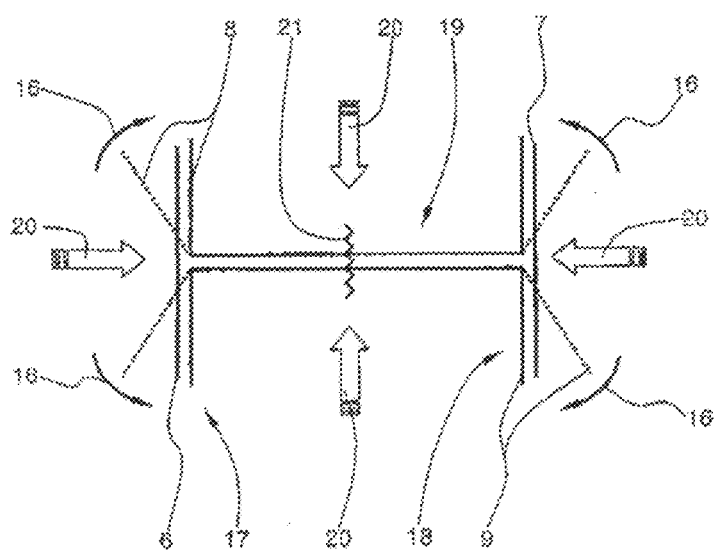

FIG. 2 illustrates the procedure for forming the profile 11 with H-shaped cross-sectional geometry from the four prepreg strips 6 to 9.

The profile 11 is formed by the prepreg strips 6 to 9. The prepreg strips 8 and 9 are initially flat, but undergo a process of folding or edge-angling in the preform device in the direction of the small black arrow 16 to give a profile shape with, in each case, U-shaped cross-sectional geometry. The dotted lines of the prepreg strips 8 and 9 symbolize one of a plurality of intermediate stages not shown in any great detail of the forming procedure. The prepreg strips 6 and 7 remain in essence without deformation and form a portion of the flanges 17 and 18 adjoining the two sides of a web 19 of the profile 11.

The profile 11 with H-shaped cross-sectional geometry is formed by bringing the prepreg strips 6 to 9 together in the direction of the large white arrows 20. The zig-zag cutting line 21 represents a possible point of separation for forming two T-shaped profiles from the H-shaped profile in the cutting device 15.

Figure 3:
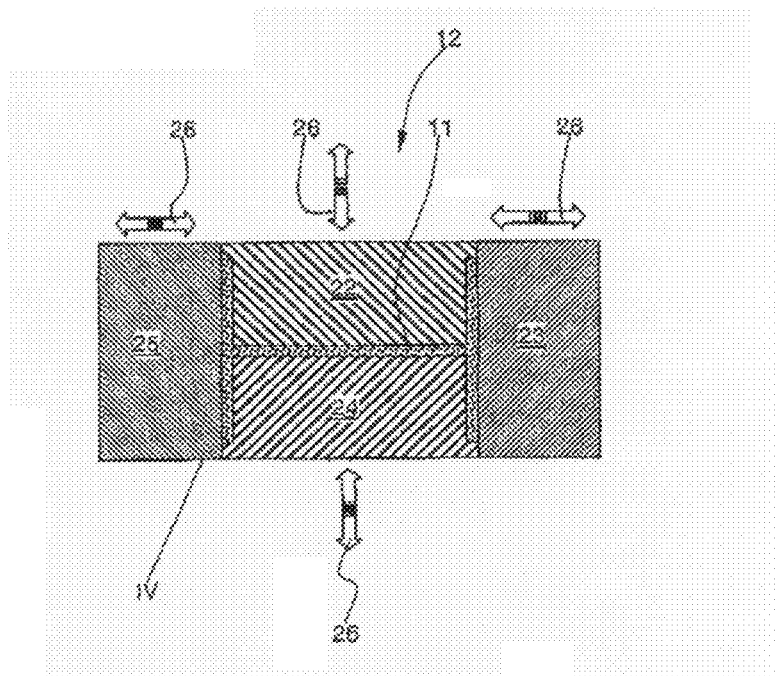

FIG. 3 is an illustration of the principle of the process sequence in the pressure-molding device 12.

The pressure-molding device 12 encompasses, in the inventive example shown, the four heated tools 22 to 25 which are brought together or pressed together in the direction of the double arrows 26, using high pressure. The result of this is the final shaping of the profile 11 and also its prehardening, in such a way that this has sufficient dimensional stability for conduct of the following steps of the process. So as to achieve sufficient prehardening of the profile 11 in the pressure-molding device 12, the (compression) tools 22 to 25 are heated to a sufficient hardening temperature for the epoxy resin, in the range from 120° C. to 250° C.

By means of the traction device 14, the profile 11 is drawn discontinuously through the pressure-molding device 12. The pressure-molding device 12 is first opened here in order that an appropriate longitudinal section of the profile 11 can be introduced, its length corresponding approximately to that of the tools of the pressure-molding device 12. Overlaps are possible here, in order that shaping and prehardening in the pressure-molding device 12 is continuous and free from discontinuities. It is possible here that in particular two end regions of the profile 11 located in the pressure-molding device 12 are subjected twice to molding and prehardening.

Following this, the pressure-molding device 12 is closed using high pressure, whereupon simultaneous application of pressure and heat achieves the actual shaping of the profile 11 and its prehardening.

Once the shaping and the prehardening has concluded, the pressure-molding device 12 is reopened and the profile 11 is transported onward to the extent of a further longitudinal section by means of the traction device 14, and a further cycle of the process can begin. The opening movement and the closing movement of the tools 22 to 25 of the pressure-molding device 12 is shown via the large white double arrows 26.

The region surrounded by a broken-line oval in the profile 11 represents one of two "radius regions", which are intended to be filled with the ("continuous" pultrusion) gusset by means of the inventive process.

Figure 4:
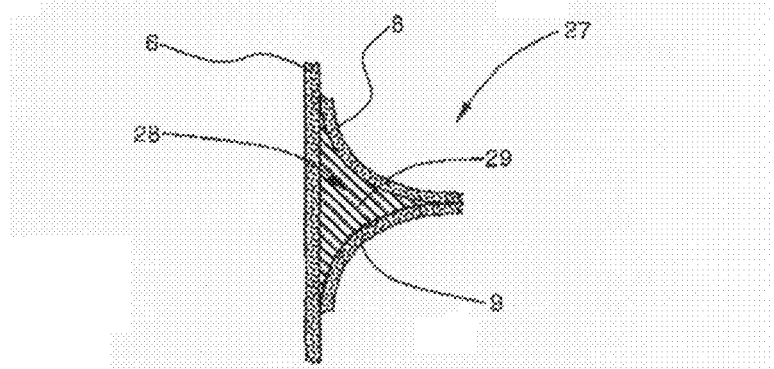

FIG. 4 shows a radius region in that region of the profile 11 where the prepreg strips 6, 8 and 9 adjoin one another.

The radius region 27 is inevitably produced when the prepreg strips 6, 8 and 9 come into contact with one another, hence it is not possible to reduce the bending radii of the two prepreg strips 8 and 9 as desired ("infinitely") during the edge-angling process. A cavity 28 is produced in this radius region, and the inventive process provides that a gusset 29 continuously braided using a wide variety of reinforcement fibers and/or of filler fibers is inserted into this. The result is complete and more particularly defined filling of the cavity 28.

Figure 5:
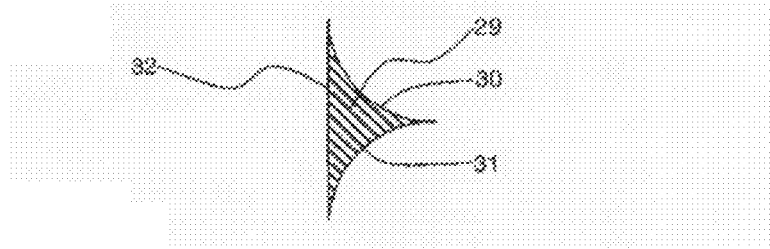

The cross-sectional geometry of the pultrusion gusset 29 corresponds approximately to an equilateral triangle, each of two equal-length edge sections of which have been curved so as to run slightly inwards in the manner of an arc (cf. FIG. 5). As a function of the cross-sectional geometry of the cavity 28 arising in the respective radius region 27, the gusset 29 can have any desired cross-sectional geometry.

The gusset 29, preferably continuously braided, is generally formed by reinforcement fibers of the same type as those also used within the prepreg strips 6 to 9. The reinforcement fibers and/or filler fibers within the gusset 29 can, for example, have a 0° orientation and/or a ±45° orientation spatially, i.e. with respect to the longitudinal axis of the profile 11. Examples of reinforcement fibers that can be used are carbon fibers, glass fibers, aramid fibers, thermoplastic reinforcement fibers, or any desired combination thereof. The resin system in which the reinforcement fibers or filler fibers of the gusset 29 have been embedded can be the same as that also used for the prepreg strips 6 to 9.

FIG. 5 shows a cross-sectional view through the gusset 29.

The gusset 29 has in essence triangular cross-sectional geometry. The equal-length sides 30 and 31 of this triangle have been curved inwards in the manner of an arc (in the shape of a segment of a circle), while a base line 32 of the triangle is straight. This geometric design ensures ideal filling, during production particularly of H-shaped profiles, of the cavities arising in the radius regions of the profile 11. The gusset 29 in particular prevents, for example in the case of H-shaped profiles composed of composite materials in the pultrusion process (known as the "ADP process") uncontrolled angular displacement of the (central) web of the profile 11 with respect to the flanges (deviations from the intended angle of 90°) and, brought about by this, variations in the thickness of the material in the radius region 27. The at least one additional (feed) reel for the at least one continuous gusset 29 is preferably arranged in the region of the reels 2 to 5. The region in which the gusset 29 is introduced between the prepreg strips 6 to 9 is preferably prior to the preform device 10. As an alternative, the at least one gusset 29 can also be placed between and/or onto the prepreg strips 6 to 9 after passage through the preform device 10. The length of the base line 32 of the gusset 29 is up to 4 mm, as a function of the dimensions of the profile 11 to be produced.

In the course of the inventive process, the gusset 29 formed continuously by reinforcement fibers or by filler fibers is drawn off from at least one additional reel and introduced into the process (cf. the abovementioned FIG. 1 showing the reel as a broken line).

Gusset geometries that can be produced in the braiding process and that can be used are not only the triangular shape but also round geometries or polygonal geometries.

LIST OF REFERENCE NUMERALS

1 Apparatus
2 Reel
3 Reel
4 Reel
5 Reel
6 Prepreg strip
7 Prepreg strip
8 Prepreg strip
9 Prepreg strip
10 Preform device
11 Profile
12 Pressure-molding device
13 Posthardening device
14 Traction device
15 Cutting device
16 Arrow
17 Flange
18 Flange 19 Web
20 Arrow
21 Cutting line
22 Tool
23 Tool
24 Tool
25 Tool
26 Double arrow
27 Radius region
28 Cavity
29 Gusset
30 Equal-length side
31 Equal-length side
32 Base line

The invention claimed is:

1. A pultrusion process for production of a profile with a plurality of prepreg strips, comprising the steps of:
   bringing together the plurality of prepreg strips and preforming the plurality of prepreg strips in a preform device into the profile;
   inserting a continuous gusset having an approximately triangular cross sectional geometry into at least one radius region of the profile, wherein a cross section of the gusset is completely formed by a plurality of continuous fibers braided with one another;
   prehardening the profile into a final shape by passing sections of the profile in quasi-continuous cycles through a heated pressure-molding device for production of a shaped profile having a final cross-sectional geometry;
   completely hardening the shaped profile in a post hardening device; and
   cutting the hardened shaped profile along a longitudinal direction of the hardened shaped profile.

2. The pultrusion process as claimed in claim 1, wherein the profile is formed with at least four prepreg strips and the hardened shaped profile has a H-shaped cross-sectional geometry.

3. The pultrusion process as claimed in claim 2, wherein the hardened shaped profile with the H-shaped cross-sectional geometry is cut into a plurality of profiles with T-shaped cross-sectional geometry by cutting longitudinally along a cutting line in the region of a web.

4. The pultrusion process as claimed in claim 1 wherein the profile is transported in the quasi-continuous cycles to the pressure-molding device by means of a traction device.

5. The pultrusion process as claimed in claim 1, wherein the plurality of prepreg strips are drawn off from at least one reel.

6. The pultrusion process as claimed in claim 1, wherein the gusset is drawn off from at least one reel.

7. The pultrusion process as claimed in claim 1, wherein the gusset has been preimpregnated with a hardenable synthetic resin material.

8. The pultrusion process as claimed in claim 1, wherein the plurality of prepreg strips are formed from a reinforcing-fiber arrangement impregnated with a thermoset plastics material.

9. The pultrusion process as claimed in claim 1, wherein passing sections of the profile in quasi-continuous cycles through the heated pressure-molding device comprises, for each cycle:
   opening the pressure-molding device;
   passing a section of the profile into the opened heated-pressure molding device;
   closing the pressure-molding device to apply heat and pressure to the section of the profile in the heated-pressure molding device, and
   wherein two end regions of the profile located in the headed-pressure molding device are subjected twice to molding and prehardening.

* * * * *